UNITED STATES PATENT OFFICE.

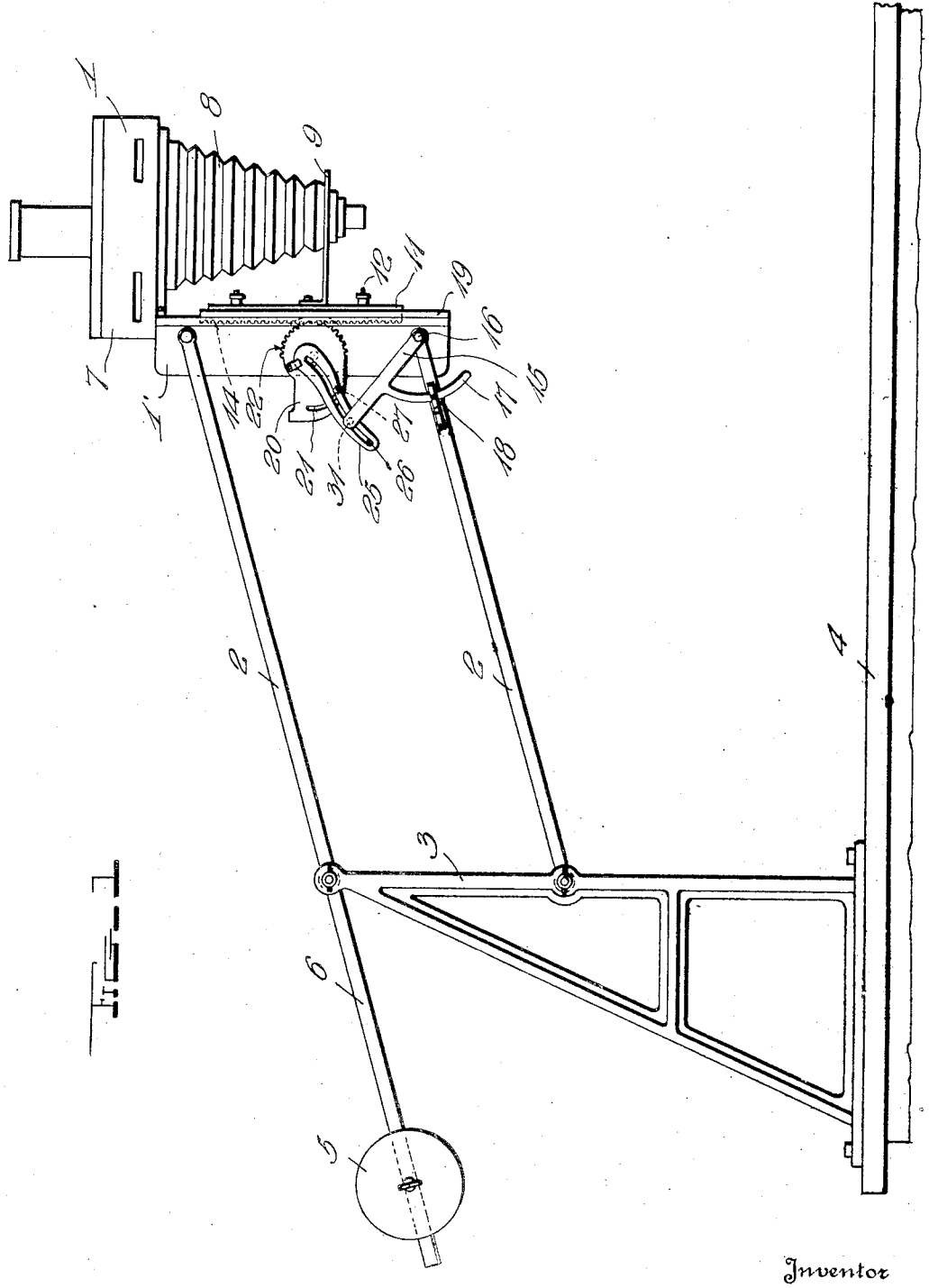

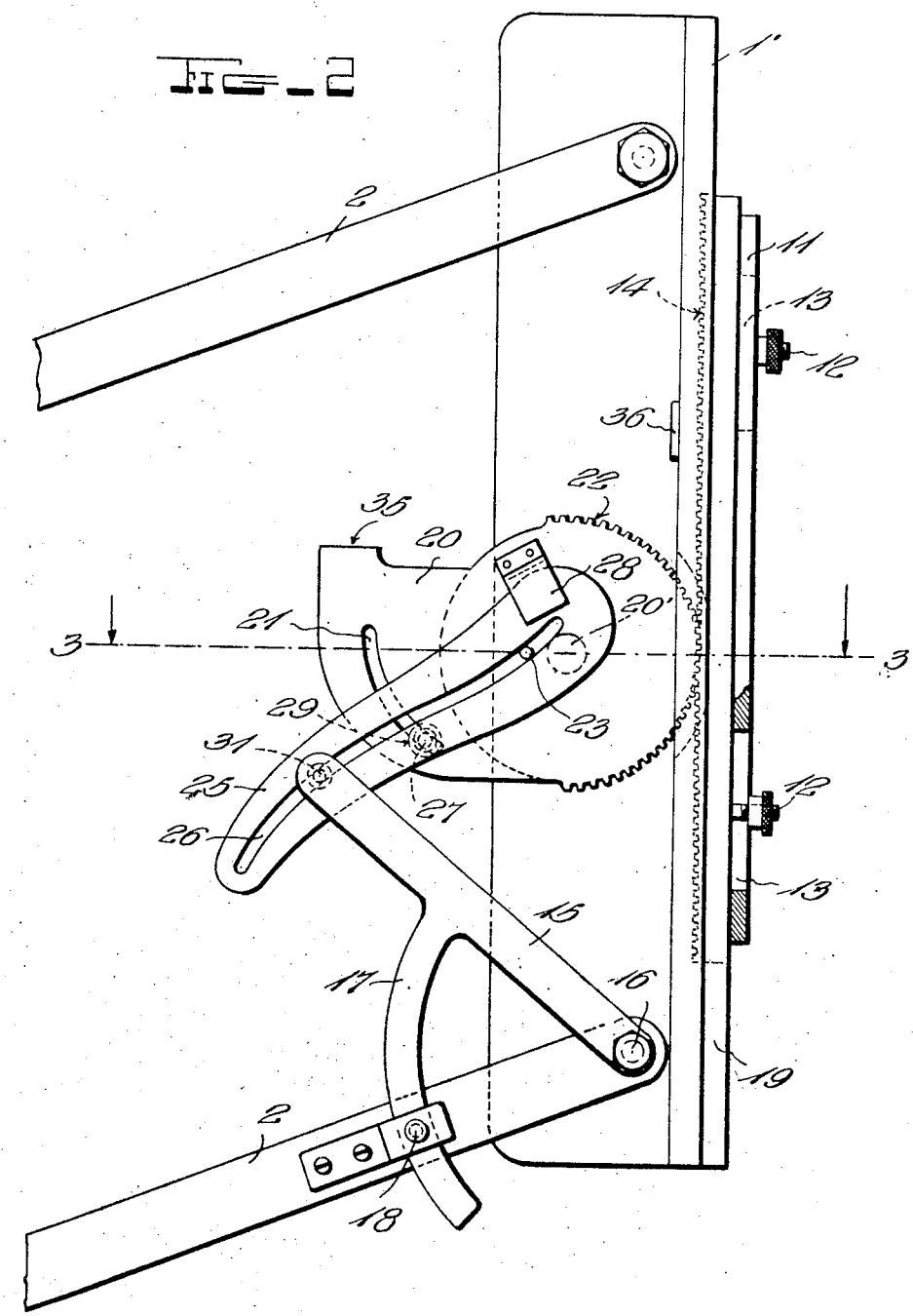

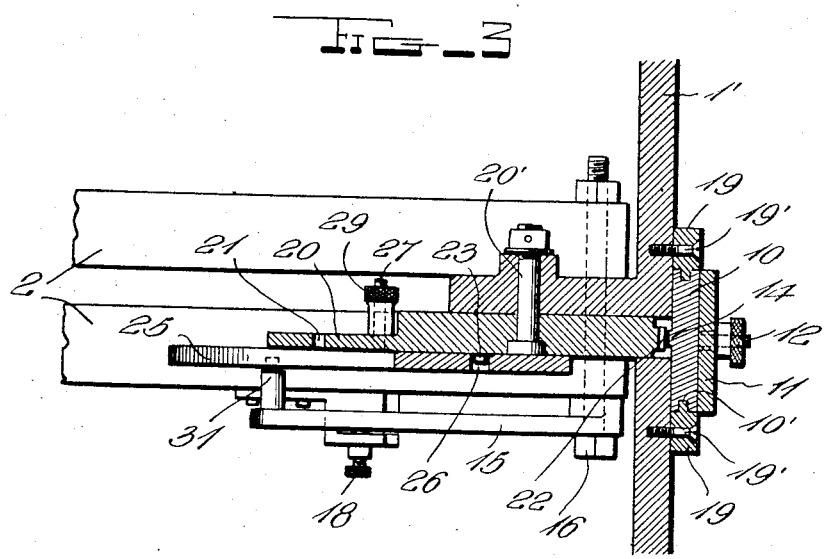
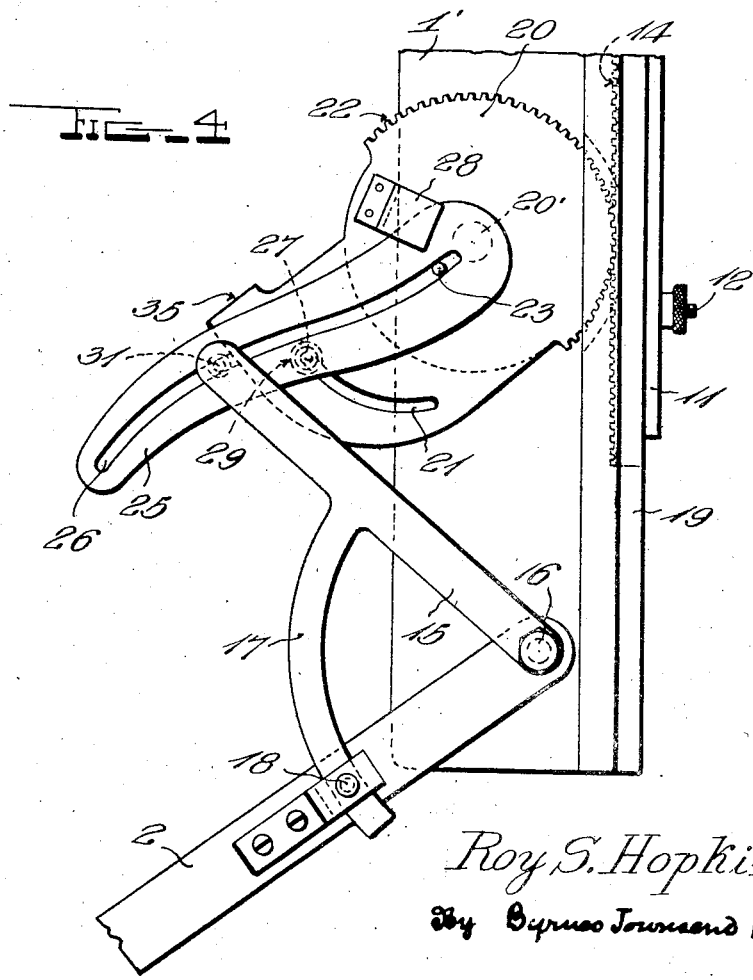

ROY S. HOPKINS, OF WASHINGTON, DISTRICT OF COLUMBIA.

AUTOMATIC-FOCUS CAMERA-SUPPORT.

1,325,154.      Specification of Letters Patent.      Patented Dec. 16, 1919.

Application filed February 6, 1918. Serial No. 215,733.

*To all whom it may concern:*

Be it known that I, ROY S. HOPKINS, a citizen of the United States, residing at Washington, in the District of Columbia, have invented certain new and useful Improvements in Automatic-Focus Camera-Supports, of which the following is a specification.

The present invention relates to a camera support and means by which a camera of any usual type may conveniently be used for making enlarged prints.

It is the principal object of this invention to provide an enlarging device with mechanism whereby lenses of different focal lengths may be held in optical correlation with the object plane and the image plane of the apparatus.

With this object in view the invention comprises the characteristic structural features more fully hereinafter described and more particularly pointed out in the claims.

For a fuller understanding of the invention reference is had to the accompanying drawings in which—

Figure 1 is a side elevation of a device embodying the invention;

Fig. 2 is a side elevation of the translating mechanism forming the essential part of the invention;

Fig. 3 is a sectional view on line 3—3 of Fig. 2; and

Fig. 4 is a side elevation of the mechanism shown in Fig. 2 representing the elements in a different relative position.

The general form of the apparatus embodying the invention is the same as that disclosed in my Patent No. 1,247,402, dated November 20, 1917.

In Fig. 1, the camera 1 is mounted on arms 2 pivoted for movement in a vertical plane on a frame 3. This frame 3 may be attached to a wall or may be supported, as is indicated, on a table 4. A weight 5 may be carried on an extension 6 of one of the arms 2 to counterbalance in the usual way the weight of the camera and other mechanism carried by the arms 2. The arms 2 are pivotally connected to the frame 3 and the camera support 1' in parallel arrangement.

The enlarging camera comprises the usual box 7 rigidly connected to the support 1', a bellows 8 secured to the frame 7 and a lens board 9 mounted upon a carrier 11. On the support 1' is slidably mounted a bar 10 carrying a rack 14 and to the bar 10 is adjustably secured the carrier 11 as by means of set screws 12 extending through slots 13 in the carrier into the bar 10.

To the lower arm 2 is adjustably connected an upstanding lug 15. The lug 15 may have a free pivotal movement about the screw 16 by which the arm 2 is attached to the support 1'; but by means of an arcuate arm 17 forming a part of the lug 15 and a set screw 18 on the arm 2, the lug 15 may be rigidly connected to arm 2 to move with it.

On the support 1' is mounted by means of a pivot 20' a plate 20 having a cam slot 21 and a circular edge portion carrying teeth 22 to engage the rack 14. The plate 20 also carries a short stud 23 eccentrically mounted thereon in this form of structure. An arm 25 has a cam slot 26 which engages the stud 23 and a stud 27 engaging the cam slot 21. Suitable means, such as a spring plate 28, attached to plate 20, may be provided to hold the arm 25 and the plate 20 against lateral separation and at the same time admit of relative sliding movement in the plane of contact. The stud 27 has preferably a screw-threaded extension to engage a nut 29 so that the arm 25 and the plate 20 may be locked together.

The lug 15 carries near its free end a stud 31 engaging the cam slot 26. The studs 23 and 31 and the arm 25 are so related that there is no interference between the studs in the cam slot 26.

The bar 10 has preferably grooves 10' engaging ribs on guides 19 which may be secured to the support 1' in any suitable way as by screws 19'.

The characteristic points of the arrangement and the operation are as follows: It may be assumed that the focal length of lens to be used is not known. To set the mechanism to this lens, set screw 18 is loosened and apparatus is moved to a low position; arm 15 is then thrown to the right to its limit of motion which brings points 35 and 36 in contact. With these points in contact the projected image is focused sharply at 1½" diameters magnification on the plane to be used as the stationary image plane.

In this position of the parts mentioned, the set screws 12 and 18 are tightened. Then the arms 2 together with the apparatus mounted thereon are pushed upwardly, preferably a considerable distance above the image plane, and the nut 29 on stud 27 is loosened while set screws 12 and 18 remain tight.

The bar 10 is then manipulated until a sharp image is again formed in the image plane. By this manipulation the plate 20 has been brought, through the engagement with the rack 14, into a definite angular position about its pivot and simultaneously the arm 25 has been forced, through the engagement of the stud 27 in the cam slot 21, to a definite position relatively to the plate 20. When the parts are in this position, the nut 29 is turned up to lock the arm 25 and the plate 20 together and the apparatus is set to maintain absolute sharp focus at any degree of enlargement from 1½ to 8" diameter when a lens of approximately 7½" focus is used on apparatus described.

The form of the cam slot 26, as computed or experimentally determined, for a particular lens, depends upon the length of the arms 2, the length of the lug 15 and the radius of the gear on the plate 20. I have found that the cam slot determined for longest focal length lens to be used may be used for any shorter focus lens by shifting the position of this cam slot relatively to its support, and that for each lens there is one definite position in which the cam slot operates for the purpose specified. By providing means, such as the cam slot 21 in plate 20 and the stud 27 on arm 25, the cam slot 26 is forced to undergo such movement relatively to its support, the plate 20, that its successive positions correspond to lenses of successively varying focal lengths.

The cam slot 21 is designed to cover a particular range of lens powers ordinarily met with in practice. It is intended to take care of lenses of 4/10 inches focal length. There is, of course, no definite limit to the range. The cam slot 26 is designed to admit of a magnification of 1½" diameter magnification as the lower limit.

Figs. 2 and 4 show by way of comparison the two extreme adjustments. Fig. 2 shows the device set for a lens of approximately 5" focus, while Fig. 4 shows an adjustment for a 10" lens. As can be easily deduced from the drawings, the rate of movement of the bar 10 in the case of Fig. 2 will be much less than in the case of Fig. 4 for the same angular movement of arms 2.

It is obvious that various structural changes may be made within the scope of the disclosure.

In the claims the term "optical correlation" is used to define the relationship of the lens, the object and stationary plane when the object and the stationary plane lie in the conjugate focal planes of the lens.

I claim:

1. An enlarging device comprising a support for the object to be enlarged, a lens holder and an image screen and means for maintaining a constant focal relation therebetween throughout the range of movement, said means including a driven member having an operating face and means individual to said operating face, including an element coöperating with predetermined parts of such face, to adapt the apparatus to lenses of different focal length.

2. An enlarging device comprising a support for the object to be enlarged, a lens holder and an image screen and means for maintaining a constant focal relation therebetween throughout the range of movement, said means including a driven member, means defining a cam surface adjustably mounted on the said member and means coöperating with the cam and individual thereto to adapt the apparatus to lenses of different focal length.

3. An enlarging device comprising a support for the object to be enlarged, a lens holder and an image screen and means for maintaining a constant focal relation therebetween throughout the range of movement, said means including a driven member having an operating face of variable curvature and means coöperating with predetermined parts of such face and individual thereto to adapt the apparatus to lenses of different focal length.

4. An enlarging device comprising a support for the object to be enlarged, a lens holder and an image screen and means for maintaining a constant focal relation therebetween throughout the range of movement, said means including a driven member having an operating face of double curvature and means coöperating with predetermined parts of such face and individual thereto to adapt the apparatus to lenses of different focal length.

5. An enlarging device comprising a support for the object to be enlarged, a lens-holder and an image screen, mechanism including a curved cam element for varying the position of said parts relatively to each other, and means for adjusting the cam element at will to hold any one of a plurality of lenses of different focal length, the support and image screen in focal relation during their relative movement.

6. An enlarging device comprising a support for the object to be enlarged, a lens holder, mechanism including a cam element for varying the positions of said support and said lens holder relatively to each other when they are moved toward or away from a stationary plane, and means for adjusting the cam element to hold any one of a plurality of lenses of different focal length, the support and the said stationary plane in focal relation during the movement of the support and the lens holder.

7. An enlarging device comprising a support for the object to be enlarged, a lens holder and means for movably supporting the support and the lens-holder toward and away from a stationary plane, means including a cam element for causing the lens holder and the said support to move at relatively different rates of speed to maintain a constant focal relation between the said plane and the said support and means for adjusting the cam element at will to adapt the apparatus to lenses of different focal length.

8. An enlarging device comprising a support for the object to be enlarged, a lensholder and means for movably supporting the support and the lens holder toward and away from a stationary plane, mechanism for causing the lens holder and the support to move at relatively different rates of speed so as to maintain a constant focal relation between the support and the said plane, said mechanism including a pivotally mounted member operatively connected to the lens holder to impart motion thereto, a cam element adjustably attached to the said member, a lever having engagement with the cam element, means for moving the lever at a rate which is proportional to the rate at which the support approaches or recedes from the said plane and means for adjusting the cam element on the said member to adapt the apparatus for lenses of different focal length.

9. In an enlarging device a pivotally supported element, a cam element, guiding means for assigning to the cam element, at will, a plurality of definite positions on the said pivoted element and means for securing the cam element in any one of such positions.

10. In an enlarging device a pivotally supported element, means thereon defining a cam surface, a cam element, a projection on the cam element for engagement with the said cam surface, guiding means on the cam element and the pivoted element coöperating with the said projection and cam surface to cause the cam element to assume a series of definite positions on the pivoted element and means for securing the cam element in any of such positions.

11. In an enlarging device a pivotally supported plate-like element, a cam slot therein, a pin eccentrically located on the element, a plate-like arm having a cam slot engaging the said pin, a lateral projection on the arm engaging the cam slot in the pivoted element, and means for securing the arm in any position which the arm may assume on the pivoted element.

12. In an enlarging device a pivotally supported element, a cam element, guiding means for assigning to the cam element, at will, a plurality of definite positions on the said pivoted element, means for securing the cam element in any one of such positions, a lever engaging the cam surface of said cam element and means for keeping the lever in contact with the said cam surface when the lever is turned about its fulcrum.

13. In an enlarging device a pivotally supported plate-like element, a cam slot therein, a pin eccentrically located on the element, a plate-like arm having a cam slot engaging the said pin, a lateral projection on the arm engaging the cam slot in the pivoted element, means for securing the arm in any position which the arm may assume on the pivoted element and a lever having a projection engaging the cam slot in the said arm.

14. The combination of two optical elements and means for moving said elements at relatively different speeds toward or away from a fixed plane of reference, said means comprising a common support for said optical elements, one of the elements being movably mounted on the support, means including a cam element for imparting a variable motion to the movably mounted element when the common support receives uniform motion and means whereby the cam element may be adjusted to determine the rate at which the motion of the movable element is varied.

15. An enlarging device comprising a camera device, a swinging support therefor constructed and arranged to move the camera device toward and away from a fixed plane of reference in planes at right angle thereto, a relatively movable element for supporting the camera lens, mechanism for translating the uniform angular motion of the swinging support into variable motion of the said movable element to maintain a constant focal relation between said plane of reference and the image plane of the camera, said mechanism including an adjustable cam.

16. An enlarging device comprising a camera device, a swinging support therefor constructed and arranged to move the camera device toward and away from a fixed plane of reference in planes at right angle thereto, a relatively movable element for supporting the camera lens, rack mechanism for imparting movement to it and an adjustable cam mechanism for translating the uniform angular motion of the swinging support into variable movement of the rack mechanism to maintain a constant focal relation between said plane of reference and the image plane of the camera.

17. An enlarging device comprising a camera device, a swinging support therefor constructed and arranged to move the camera device toward and away from a fixed plane of reference in planes at right angle thereto, a relatively movable element for supporting the camera lens, a rack connected with said element, a pivotally mounted disk having teeth to engage the rack, a cam carried by the disk, means on the swinging support engaging the said cam, said means and said cam being formed to translate the uniform angular movement of the swinging support into variable movement of the rack to thereby maintain a constant focal relation between the said plane of reference and the image plane of the camera, and means for adjusting the cam on the said disk to vary the movement of the rack for any one of a plurality of lenses of different powers.

In testimony whereof, I affix my signature.

ROY S. HOPKINS.